United States Patent [19]

Dao Trong et al.

[11] Patent Number: 5,363,321
[45] Date of Patent: Nov. 8, 1994

[54] DIGITAL CIRCUIT FOR CALCULATING A LOGARITHM OF A NUMBER

[75] Inventors: Son Dao Trong, Stuttgart; Klaus Helwig, Sindelfingen; Markus Loch, Wittlich, all of Germany

[73] Assignee: International Business Machines Corporation, Armonk, N.Y.

[21] Appl. No.: 69,954

[22] Filed: May 28, 1993

[30] Foreign Application Priority Data

Jun. 3, 1992 [DE] Germany .......................... 92109342

[51] Int. Cl.$^5$ ............................... G06F 7/00
[52] U.S. Cl. .................................. 364/748.5
[58] Field of Search ................. 364/748.5; 341/75

[56] References Cited

U.S. PATENT DOCUMENTS 3,631,230 12/1971 Chen ........................... 235/164
4,583,180 4/1986 Kmetz .................... 364/748.5 X
4,626,825 12/1986 Burleson et al. ......... 364/748.5 X

FOREIGN PATENT DOCUMENTS 3030124 8/1980 Germany .
3622205 2/1986 Germany .
57-187725 11/1982 Japan ................... 364/748.5
59-218550 12/1984 Japan ................... 364/748.5

OTHER PUBLICATIONS

Andrews "Algorithm for finding Logarithms of binary numbers to the base two", IBM Tech Discl. Bull., vol. 11 No. 8, Jan. 1969, pp. 94–916.
IBM TDB vol. 11, No. 8, Jan. 1969, pp. 914.
Computer Design, vol. 13, No. 7, Jul. 1974, Littleton, Mass., p. 106 M. Ciugudean, "Algorithm for Computing Logarithms and Antilogarithms".
Electronics Letters, vol. 12, No. 4, Feb. 19, 1976, Enage, GB, pp. 106–107, S. Magar et al., "Fast Logarithmic D. A. Conversion With Small Error".

*Primary Examiner*—Tan V. Mai
*Attorney, Agent, or Firm*—Arthur J. Samodovitz

[57] ABSTRACT

A digital circuit computes the logarithm of a number. The circuit makes the computation by first determining a multiplicity of factors $f_i$ from a predetermined set of factors such that the product of the multiplicity of factors $f_i$ and the number equals the base of the logarithm. A memory stores the logarithms of all the numbers in the predetermined set. The circuit then looks-up and sums the logarithms of the multiplicity of factors $f_i$, and then subtracts the sum from one to yield the logarithm of the number.

27 Claims, 4 Drawing Sheets

DIGITAL CIRCUIT FOR CALCULATING A LOGARITHM OF A NUMBER

BACKGROUND OF THE INVENTION

The invention relates generally to computer systems and deals more particularly with a digital circuit and method for rapidly calculating the logarithm of a number.

The calculation of a logarithm in prior art computer systems is often based on software implementations of a mathematical algorithm for the calculation of a logarithm, such as power series expansion. Other computer systems rely on storage of large tables of logarithms.

In some prior art computer systems the calculation of a logarithm is sped up by the employment of a floating point unit or a mathematical coprocessor. However even the fastest state of the art floating point units available, such as the Intel-processor 80387, require about one hundred machine cycles for calculating the logarithm of a floating point number. In scientific or technical applications the calculation of logarithms is required frequently, so that a reduction of the number of machine cycles required for calculating a logarithm significantly enhances the performance in these cases.

From the IBM Technical Disclosure Bulletin, Volume 11, No. 8, January 1969, pp. 914, an algorithm for finding logarithms of binary numbers to the base 2 is known. Only shift operations and at most a one-add need to be performed to find the logarithm. However the accuracy of the logarithmation is limited to four binary digits according to this algorithm.

A similar method and a device for logarithmic representation of binary numbers in analog form is described in Instruments and Experimental Techniques, Volume 29, No. 3, pt. 1, page 630-1. This device comprises a logarithmic converter in which the mantissa of the logarithm is obtained from the values of several significant bits of a binary number with the aid of a table stored in read-only memory. The obtained codes are then put into analog form by a digital to analog converter.

From DE-A-3 622 205 a digital circuit for logarithmic signal processing is known. The integrated circuit comprises a comparator array logic having a plurality of interconnected comparators arranged in an array. This approach is costly in terms of the hardware needed for its realization.

From DE-A-3 030 124 method and apparatus for logarithmic calculations are known. This method only provides for a rough approximation of the logarithm of a number, which is not sufficient in most applications.

From an article entitled "Fast Logarithmic D.A. Conversation with Small Error" in Electronics Letters, 19th February 1976, Volume 12, No. 4, pp. 100, a technique for the conversion of floating-point digital numbers to the corresponding logarithmic analog values is known. This technique is based on the division of the mantissa into two parts. The more significant part of the mantissa is decoded by a logarithmic decoder logic having a number of inputs corresponding to the number of digits in the more significant part of the mantissa. The major drawback of this technique is the expense necessary in terms of hardware, restriction to a predefined number of digits and a relatively low degree of accuracy.

It is therefore an object of the invention, to provide an improved digital circuit and method for calculating the logarithm of a number.

In particular the invention is aimed to reduce the number of machine cycles needed to calculate a logarithm with a high degree of accuracy.

SUMMARY OF THE INVENTION

The invention resides in computer hardware and associated process for calculating a logarithm to a base B of a number M. The basic strategy is to store a predetermined set of logarithms of factors and then determine the required logarithm of M to the base B based on a combination of the predetermined logarithms. Consequently, a time consuming processes for dynamically determining a logarithm according to the prior art is not required. Instead, a quicker process of determining the corresponding combination of factors, looking-up the logarithms in the combination from the predetermined set and then combining the predetermined logarithms is used.

Thus, the hardware and process of the present invention determine a plurality (p) of factors $f_i$ (i.e. $f_1 \times f_2 \times \ldots f_p$) from a predetermined set of numbers, such that $M \times f_1 \times f_2 \times \ldots f_p$ approximates or equals the base B. Approximate or exact logarithms to the base B of the numbers in the predetermined set are stored. Then, the logarithms to the base B of the factors $f_i$ are summed and the sum is subtracted from one to yield an approximate or exact value for the logarithm of M to the base B.

DETAILED DESCRIPTION OF THE PREFERRED EMBODIMENTS

Figures 1, 5:
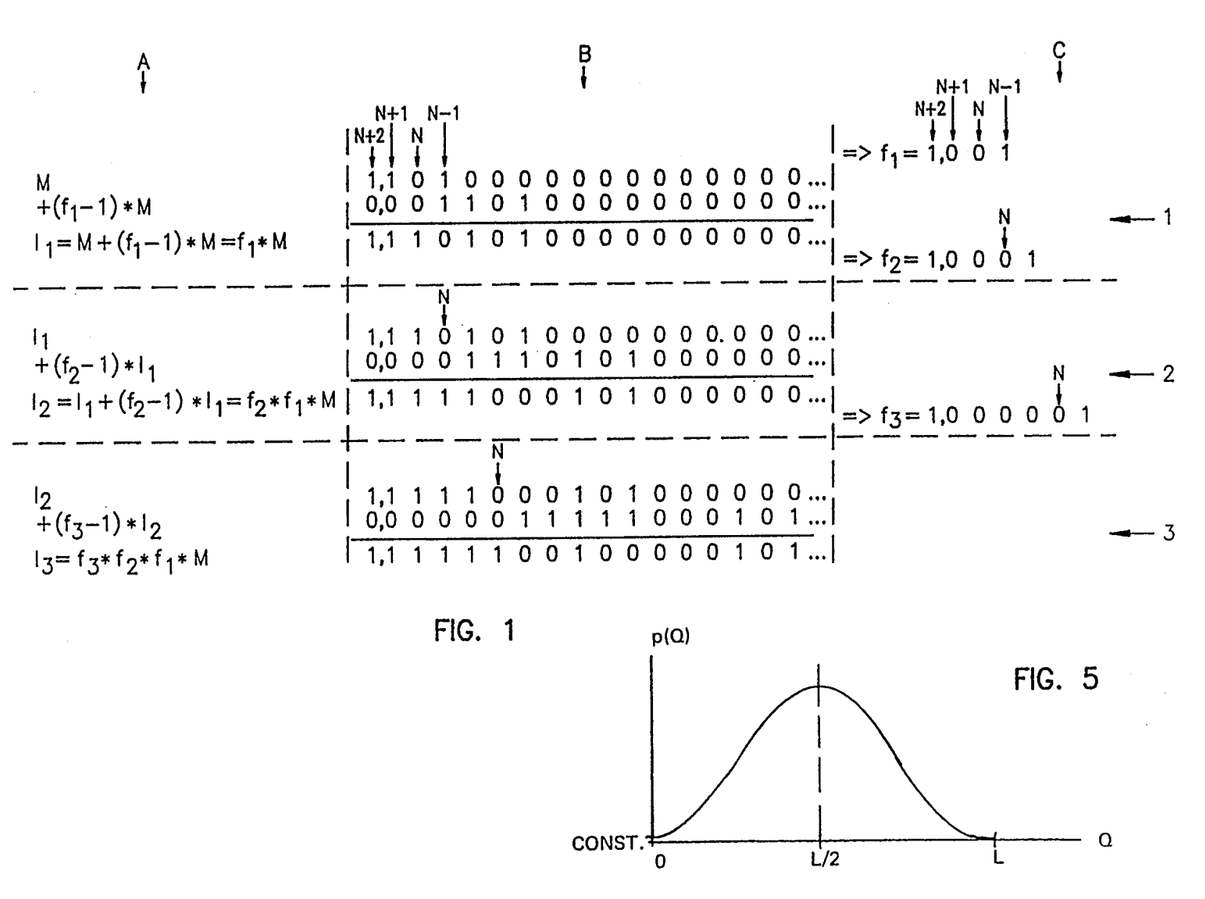
FIGS. 1 and 2 show an example of the calculation of the logarithm according to the invention.
FIG. 5 is a diagram showing the probability distribution of the number of multiplications necessary to calculate the logarithm according to the invention.
Figure 2:
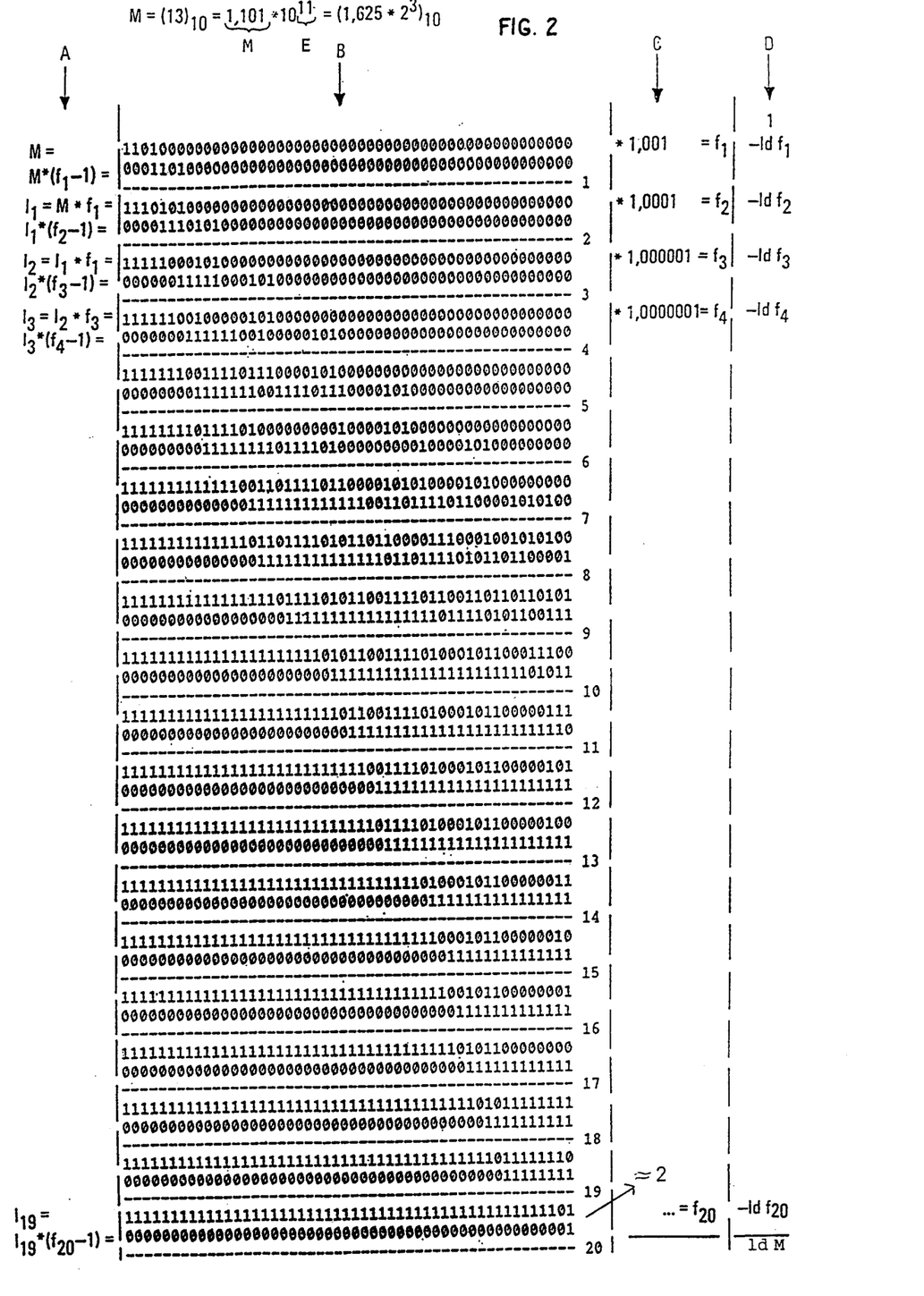

The following is a general but detailed description of the present invention; a detailed description of a specific example with reference to FIGS. 1 and 2 follows. The first step in determining the logarithm of M to the base B is based on the following:

$$M \cdot f_1 \cdot f_2 \cdot \ldots = M \cdot \pi f_i = B, \tag{1}$$

where $f_i$ are factors from a predetermined set. If the logarithm to the base B of the number M ($\log_B M$) is to be calculated, logarithmation of equation (1) yields $$\log_B M + \log_B f_1 + \log_B f_2 = \log_B M + \sum_i \log_B f_i = \log_B B = 1. \tag{2}$$

Transformation of equation (2) yields $$\log_B M = S_i = 1 - \sum_i \log_B f_i. \tag{3}$$

Thus the calculation of the logarithm to the base B of the number M, which is denoted $\log_B M$, may be reduced to a summation $S_i$, if the factors $f_i$ and their logarithms $\log_B f_i$ are known.

The invention provides for a way of finding appropriate factors $f_i$. It is assumed in the following that the number M is normalized, so that $1 \leq M \leq B$, where B is the base of the number system which is employed for the calculation. Even though the inventive concept may be applied for other number systems having an arbitrary base B, the binary system where B equals 2 will mainly be considered in the following.

The following is a description of a procedure for $B=2$ to find the factors $f_i$: First the number M is searched for a leading zero, or in other words the digit position N of the most significant zero digit in the number M is detected. This is to determine the first factor $f_1$. An appropriate choice for the first factor $f_1$ is given by equation (4):

N-1th digit $$f_1 = 1 + 2^{N-1} = 1{,}00 \ldots 0\ 1, \tag{4}$$

where it is assumed that N equals the power of the base B of the number system at the corresponding digit position N.

This choice of $f_1$ implies that $f_1$ is always greater than 1, since the first digit as well as the N-1th digit of $f_1$ equals 1 as it is indicated by the arrow in equation (4). Multiplication of M with the first factor $f_1$ yields a first intermediate value $I_1$ $$I_1 = M \cdot f_1. \tag{5}$$

The first intermediate value $I_1$ is slightly greater than M, because of the above described properties of the first factor $f_1$. Thus equation (5) constitutes a first approximation of equation (1).

Second, the first intermediate value $I_1$ is searched for the digit's position N of the most significant zero digit analogously to the first search performed in the number M. This serves to determine a second factor $f_2$, whereby equation (4) is applied correspondingly with the new value of the digit position N. Multiplication of the first intermediate value $I_1$ with the second factor $f_2$ yields $$I_2 = I_1 \cdot f_2 = M \cdot f_1 \cdot f_2. \tag{6}$$

Thus equation (6) constitutes an even better approximation of equation (1). This procedure may be repeated several times iteratively, so that subsequent further intermediate values $I_K$ $$\begin{aligned} I_K &= I_{K-1} \cdot f_K \\ &= M \cdot f_1 \cdot f_2 \cdot \ldots \cdot f_K = M \cdot \pi f_K \\ & \phantom{= M \cdot f_1 \cdot f_2 \cdot} K \end{aligned} \tag{7}$$

are calculated. Subsequent intermediate values $I_K$ more and more approach B. This is due to the above described choice of the factors $f_i$, where $$f_i = 1 + 2^{N-1}. \tag{8}$$

Thus the above described procedure comprises the steps of searching the digit position of a leading zero in the number M or in subsequent intermediate values $I_{K-1}$, choosing a factor $f_i$ based on the result of that search and calculating a first intermediate value $I_1$ or a further intermediate value $I_K$, respectively. These steps are repeated iteratively, so that a sub-set of factors $f_i$ of the set of factors $F_i$ is determined.

Every repetition of the above described procedure slightly increases the intermediate value $I_K$, since a multiplication by a factor $f_K$ which is greater than 1 takes place in every repetition. This implies that the leading zero digit in an intermediate value $I_K$ migrates more and more to a less significant digit position during the repetition of the procedure. Logically this further results in the determination of decreasing factors $f_i$ that approach more and more 1, because of the definition given in equation (9) of factors $f_i$.

After a number of repetitions of the above described procedure factors $f_i$ are determined, so that the product $$M \cdot \pi f_i \atop i \tag{9}$$

at least approximately equals the base B, so that equation (1) is at least approximately satisfied. If the logarithms to the base B of the factors $f_i$ are known, $\log_B M$ is obtained by equation (3).

When the inventive concept is incorporated in a digital circuit, such as an arithmetic unit, e.g. of a computer system or control system, one has to deal with a finite degree of accuracy. This is due to the fact that technical computing systems generally are restricted to a finite number of digits for representation of a number. The number M may be represented by $L+1$ digit positions in such a computing system so that it has the following format:

$$1, a_1\ a_2\ a_3 \ldots a_L, \tag{10}$$

where the numbers $a_1$ to $a_L$ symbolize the L digit positions behind the decimal point. Consequently, according to the representation given by equation (10) the condition $1 \leq M < 2$ still holds, since the binary system is employed.

A restricted number of L digit positions implies that at most L factors $f_i$ are used in the above described procedure, since in this case there are only L different digit positions for the occurrence of a leading zero. This is because the determination of a factor $f_i$ depends on the detection of a leading zero in the number M or in an intermediate result $I_K$ at a position N according to equation (8). If there are L digit positions behind the decimal point, this implies that N may only have L different values resulting in a maximum of L different factors $f_i$.

Thus it is possible to predefine a set of factors $F_i$, whereby all possible factors $f_i$ which may potentially be used in the above described procedure are comprised in this set of factors $F_i$. This simplifies the above described procedure, since the factors $f_i$ may be determined as a subset of said set of factors $F_i$ based on subsequent determinations of the digit position of a leading zero. Further, the calculation of $\log_B M$ according to equation (3) is therewith greatly simplified and sped up as it will become clearer in the following.

Since the set of factors $F_i$ comprises a finite and predefined number L of possible factors $f_i$, the same applies for the logarithms to the base B of the factors $f_i$. The L different logarithms $\log_B f_i$ of the L possible factors $f_i$ are stored in a look-up table. Each entry in the look-up table corresponds to a representation of the logarithm of a certain factor $f_i$, so that the look-up table comprises L entries.

If in the above described procedure a first factor $f_1$ is determined and thus chosen from the set of factors $F_i$, the look-up table is accessed based on this choice of the first factor $f_1$ to fetch the corresponding entry from the look-up table. This entry in the look-up table is a representation of the logarithm $\log_B f_1$ to the base B of the first factor $f_1$. Further a first sub-total $$S_1 = 1 - \log_B f_1 \tag{11}$$

is calculated, whereby $S_1$ is a first approximation of $\log_B M$ according to equation (3). In subsequent repetitions of the above described procedure, subsequent factors $f_i$ are determined. Each choice of a factor $f_i$ from the set of factors $F_i$ implies an access to the look-up table, where the corresponding logarithm is stored. Thus in each repetition of the above described procedure a further approximation $S_j$ of $\log_B M$ is obtained.

This may be expressed in more general terms: If in the Kth repetition of the above described procedure a factor $f_K$ is chosen from the set of factors $F_i$, the look-up table is accessed to fetch an entry stored therein. This entry comprises a representation of $\log_B f_K$. This entry fetched from the look-up table serves to calculate the Kth approximation of $\log_B M$ according to equation (3), where the Kth approximation $S_K$ is given as $$S_K = S_{K-1} - \log_B f_K. \tag{12}$$

The iterative repetition of the above described procedure is stopped, if a certain predefined condition is fulfilled. This condition is advantageously chosen in consideration of the technical environment in which the calculation of the logarithm is needed. In a control system for example it may be essential that the calculation of the logarithm is finished after a predefined maximum time delay. In this case a suitable condition would be a maximum number of repetitions of the above described procedure corresponding to a maximum time delay. In other applications, such as in scientific calculations, the best possible accuracy of the result is desirable. For those applications the repetition may be continued until the smallest factor $f_i$ of said set of factors $F_i$ is chosen or the intermediate value $I_K$ is a very close approximation to the base B. Other applications include simulation of an electric field or magnetic field, signal processing in radar, control of a chemical process in which a concentration varies according in a logarithmic function. For example, a ph value is the logarithm of the reciprocal of a hydrogen ion concentration in gram equivalents per liter of solution. After measuring the hydrogen ion concentration, the ph can be determined using the present invention.

It is to be noted that the choice of factors $f_i$ and the calculation of the subtotals $S_k$ may be performed in parallel if a suitable computing system is used. This is because the time needed for the calculation of the Kth approximation $S_K$ of the logarithm $\log_B M$ according to equation (12) may be used to choose the next factor $f_{K+1}$.

According to another aspect of the invention, this concept is advantageously implemented in a digital circuit. The digital circuit comprises two sub-circuits working in parallel. The first sub-circuit is adapted to choose the factors $f_i$. Therefore the first sub-circuit comprises a leading zeros detector to find the digit position N of the most significant zero digit in the number M and in subsequent approximations $I_K$ according to the above described procedure. Further the first circuit comprises a barrel shifter and an adder as well as register means to calculate the approximations $I_K$ according to equation (7).

The second sub-circuit comprises a look-up table for storage of the L different logarithms of all possible factors $f_i$ as described above. Further the second subcircuit comprises adder and register means to calculate the approximations $S_K$ of the logarithm $\log_B M$ according to equation (12). If a leading zero is detected by said first sub-circuit, this corresponds to the choice of a certain factor $f_i$. The information about the choice of a factor $f_i$ is transmitted to the second sub-circuit, where the look-up table is accessed based on this information. The corresponding entry which represents the logarithm $\log_B f_i$ of the factor $f_i$ is thus fetched from the look-up table. This logarithm serves to calculate a further approximation $S_K$ of the logarithm $\log_B M$ according to equation (12).

It is to be understood that the above described inventive concept is not restricted to a number M fulfilling the condition $$1 \leq M < B. \tag{13}$$

If the logarithm to a base B of an arbitrary floating point number m is to be calculated, the inventive concept is also applicable. This is because the floating point number m may be represented as $$m = M \cdot B^E, \tag{14}$$

where the number M is the mantissa and the number E is the exponent of the floating point number m. As it is well known in the art, it is always possible to normalize the mantissa M of the floating point number m, so that equation (13) holds. This is achieved by an appropriate choice of the exponent E. Logarithmation of equation (14) yields equation (15)

$$\log_B m = \log_B M + E. \tag{15}$$

As it is apparent from equation (15) the calculation of the logarithm $\log_B m$ requires the calculation of the logarithm $\log_B M$ as well as an additional summation of the exponent E. The calculation of the logarithm $\log_B M$ is accomplished by applying the above described inventive procedure, since the mantissa M satisfies equation (13).

If the base of the number system B which is used for the calculation is chosen to be different from 2, so that the binary system is not used, it may be advantageous to deviate from the definition of the factors $f_i$ given by equation (8). In this case it may be more appropriate to apply one of the definitions given by equations (16) and (17):

$$f_i = 1 + B^{N-1} \tag{16}$$

$$f_i = 1 + (B - Y)^{N-1}, \tag{17}$$

where Y is an arbitrary number which is greater than the base B of the number system. These definitions of the factors $f_i$ are compatible to the above described iterative procedure. It should be noted, that equation (16) equals equation (8), if the base of the number system B equals 2.

The inventive concept is particularly valuable in an environment, where high speed logarithmation with a high degree of accuracy is needed. In average, the calculation of a logarithm according to the teaching of the invention takes only about L/2+const. machine cycles, where const. is a constant value representing the number of machine cycles necessary to normalize the mantissa M and to add the exponent E. In practice const. is lesser or equal than five. Thus the digital circuit according to the invention is more than two times faster than the best state of the art floating points units available. Further the implementation of the inventive concept in a digital circuit is realized by a small amount of expenditure. Only about five thousand logic cells are needed for the realization of the digital circuit. With state of the art technology this results in only about five percent usage of the entire chip area. Thus the inventive arithmetic unit is advantageously incorporated in a micro chip processor, such as an arithmetic unit, of a computer system. Further the invention is used in control means, where fast logarithmation is required, as well as in a fast logarithmic digital to analog converter, which is often required in radar, communication and instrumentation generally. In the fast logarithmic digital to analog converter first the logarithmation is performed by the inventive digital circuit and the result of the logarithmation is then converted to an analog signal by a digital to analog converter.

The following is a description of a specific example with reference to FIGS. 1 and 2. In FIG. 1 and 2 the calculation of the logarithm of a number $$m = M \cdot B^E \quad (14)$$

is shown by way of example, where the mantissa M equals 1,101 and the exponent E equals 11 in the binary system, corresponding to $m = 1,625 \cdot 2^3$ in the decimal system.

In column A of FIG. 1 the calculations performed in subsequent steps of the above described procedure are shown symbolically. Column B shows the actual transformations of the mantissa M required to calculate the logarithm, whereas in column C the choice of a factor $f_i$ is depicted for each iteration i. In FIG. 1 three repetitions of the above described procedure are depicted corresponding to iterations 1, 2, 3 as indicated by the respective reference numerals. The initialization of the above described procedure is shown in the first row of the table depicted in FIG. 1. First, the mantissa M is searched for a leading zero. The most significant zero digit in the mantissa M is denoted N in column B. The determination of the digit position N of the most significant zero digit serves to determine the first factor $f_1$, where $f_i$ equals 1,001 as shown in column C. This choice of the first factor $f_i$ corresponds to equation (4). Further, the mantissa M is multiplied by a factor $f_1 - 1$ which equals 0,001. Actually this multiplication only requires barrel shifting of the mantissa M by a number of digit positions corresponding to the value of N−1. Further, the mantissa M and the result of that multiplication are added so that a first intermediate value $I_1$ is obtained according to equation (5).

The first intermediate value $I_1$ is the initial value for the second iteration 2 of the above described procedure which is depicted in the second row of the table shown in FIG. 1. The first intermediate value is searched for a leading zero analogously to the search performed in the mantissa M in the first iteration. Likewise the second factor $f_2$ is determined according to equation (8). Then the first intermediate value $I_1$ is barrel shifted according to the choice of the second factor $f_2$. Further, the first intermediate value $I_1$ and the result of that step of barrel shifting, corresponding to a multiplication of the first intermediate value $I_1$ by a factor $f_2 - 1$ are added. The result of this addition equals a second intermediate value, which again is searched for a leading zero in the third iteration 3 shown in FIG. 1. The steps of barrel shifting and adding are carried out once again analogously which results in a third intermediate value $I_3$. This procedure may be continued for a number of further iterations until the intermediate values $I_K$ are a good approximation to the base B.

FIG. 2 shows an example of a complete calculation of the logarithm to the base 2 of the number m. The number m is represented by fifty digit positions resulting in L=49 digit positions behind the decimal point. The columns A, B, and C shown in FIG. 2 correspond to the respective columns in FIG. 1. Column D shows the operations which are performed in parallel according to this preferred embodiment of the invention. After each choice of a factor $f_i$ the corresponding logarithm $$\log_2 f_i = 1 df_i \quad (18)$$

is subtracted from the initial value 1d2 which equals 1. This corresponds to the calculation of subsequent approximations $S_K$ as described by equation (12) in each iteration. In the example shown in FIG. 2 twenty iterations are carried out according to the reference numerals 1 to 20. The last intermediate result $I_{19}$ which is obtained results in the choice of the factor $f_{20}$. The factor $f_{20} - 1$ which would normally serve to obtain a further intermediate result $I_{20}$ is the smallest possible number which can be represented by the fifty digit positions. Thus the procedure is stopped at this point, since the accuracy of the result may not be further increased by additional repetitions of the above described procedure. This is due to the restriction to a fixed number of digit positions which in this case is equal to fifty for the representation of a number. This restriction implies that at most L=49 different factors $f_i$ are possibly to be used in the calculation of a logarithm. It is advantageous to store all possible factors $f_i$ which may potentially be used as a predetermined set of factors $F_i$. This is because in most cases only a subset of factors $f_i$ of the set of factors $F_i$ is required to calculate the logarithm. This is also valid for the example shown in FIG. 2, since only factors $f_1$ to $f_{20}$ are chosen from the set of factors $F_i$ comprising L=49 different factors.

Likewise the logarithms of all possible factors $f_i$ are stored on a look-up table. The look-up table is accessed by the choice of a specific factor $f_i$, whereby the logarithm of this specific factor $f_i$ is fetched from the look-up table. Subsequently the logarithm of this specific factor $f_i$ is subtracted from the initial value 1d2 as shown in column D whereby this operation is performed in parallel to the determination of a further factor $f_{i+1}$, if a suitable computing system is used.

Figure 3:
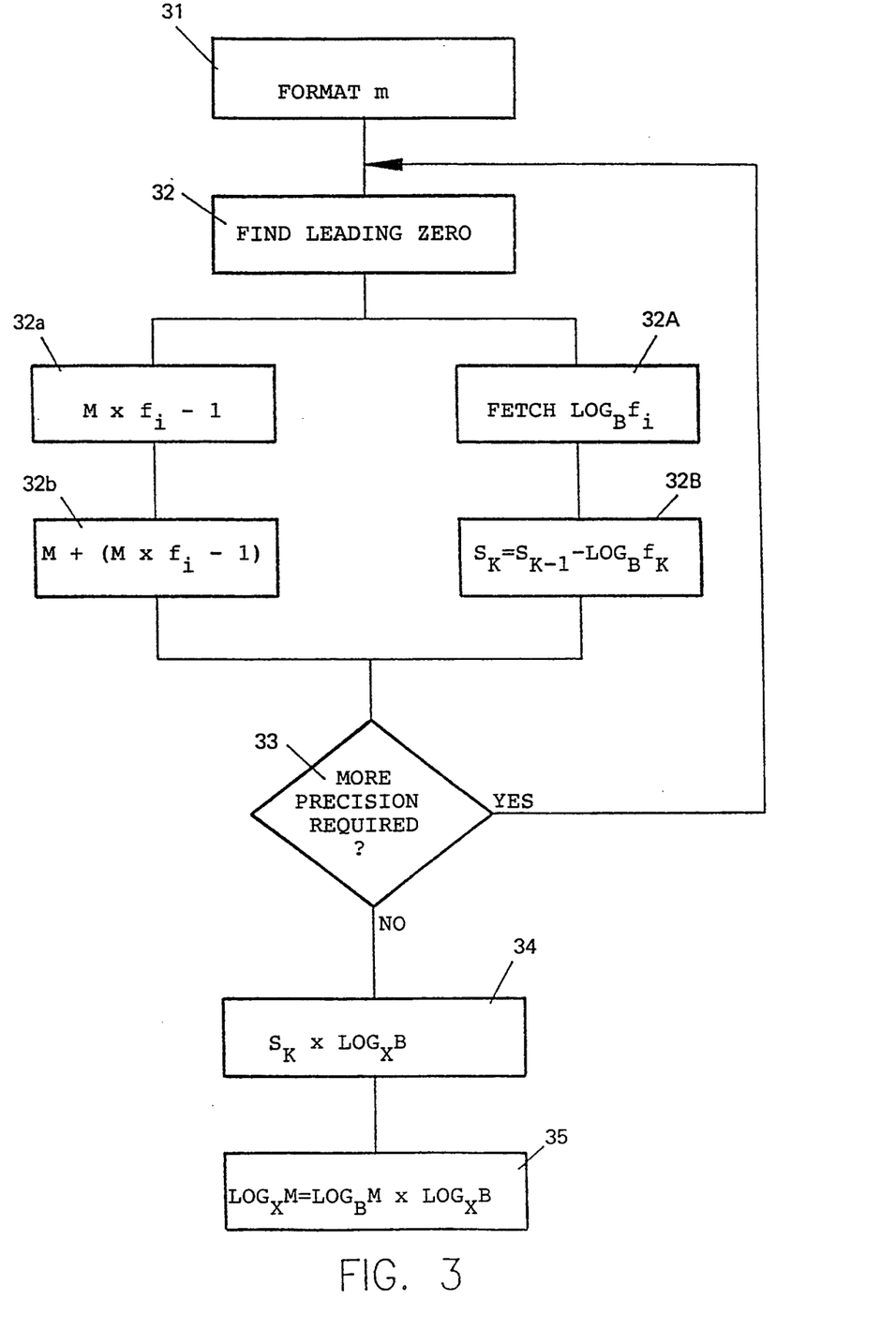
FIG. 3 is a flow-chart illustrating the inventive method.

In the following the inventive concept is described in more general terms with reference to FIG. 3. FIG. 3 shows a flowchart describing the steps to be carried out to calculate a logarithm to the base X of an arbitrary number m. In step 31 the number m is formatted. This results in a representation of the number m according to equation (14) whereby the mantissa M of the number m is normalized so that condition (13) holds. The mantissa M is denoted "present intermediate value".

In a step 32 the present intermediate value is searched for a leading zero. Thus the digit position N of the most significant zero digit in the present intermediate value is detected. Consequently a factor $f_i$ is determined according to equation (16) or (17).

The following steps 32a and 32b result in the multiplication of the mantissa M by the factor $f_i$. In the step 32a the mantissa is multiplied by a factor $f_i-1$. It is advantageous to carry out this multiplication by barrel shifting the mantissa M by a number of digit positions corresponding to the value of $N-1$. In step 32b the mantissa M and the result of that multiplication are added so that a further intermediate value is obtained according to equation (7). This further intermediate value is denoted "present intermediate value".

In a step 32A and 32B an approximation of $\log_B M$ is calculated. In step 32A the logarithm $\log_B f_i$ of said factor is obtained. In step 32B this logarithm serves to calculate an approximation $S_K$ according to equation (12).

In a step 33 it is determined whether a certain criterion is fulfilled. If the criterion is not fulfilled the control returns back to step 32, so that a further approximation $S_{K+1}$ is calculated.

If the criterion is fulfilled, step 34 is carried out. In step 34 the approximation $S_K$ is multiplied by a certain factor, if the base X of the logarithm which is to be calculated does not equal the base B. This factor equals $\log_X B$, considering equation (19):

$$\log_X M = \log_B M \cdot \log_X B. \tag{19}$$

Further step 35 is carried out so that the approximation obtained for $\log_X M$ according to equation (19) and the exponent E are added. This results in an approximation of the logarithm $\log_X m$. It is advantageous to store the logarithms of the factors $f_i$ in a look-up table, so that the logarithm required in step 32A may easily be obtained. If the logarithms of the factors $f_i$ are stored in the look-up table in an ordered sequence, e.g. the logarithm of the first factor 1 being stored on the first storage position and the logarithm of the smallest possible factor $f_L$ being stored on the last storage position, the address of the required entry in the look-up table is easily obtained just based on the detection of the digit position N in step 32.

Further it is advantageous to choose an appropriate criterion for the decision taken in step 33. The criterion may be chosen in consideration of the technical environment in which the calculation of the logarithm is used. A suitable criterion might be a maximum number of iterations so that the control exits from the loop shown in FIG. 3 after a maximum number of repetitions of steps 32 to 33. Another suitable criterion might be a certain degree of approximation of an intermediate value $I_K$ to the base B. Thus if equation (20):

$$I_K + \epsilon \geq B \tag{20}$$

holds, the loop is interrupted. The number $\epsilon$ in equation (20) is chosen as an arbitrary smaller number. A further possible criterion is that the choice of the smallest possible factor $f_i$ has taken place as it is the case in the example shown in FIG. 2. In the example shown in FIG. 2, this factor is the factor $f_{20}$.

Figure 4:
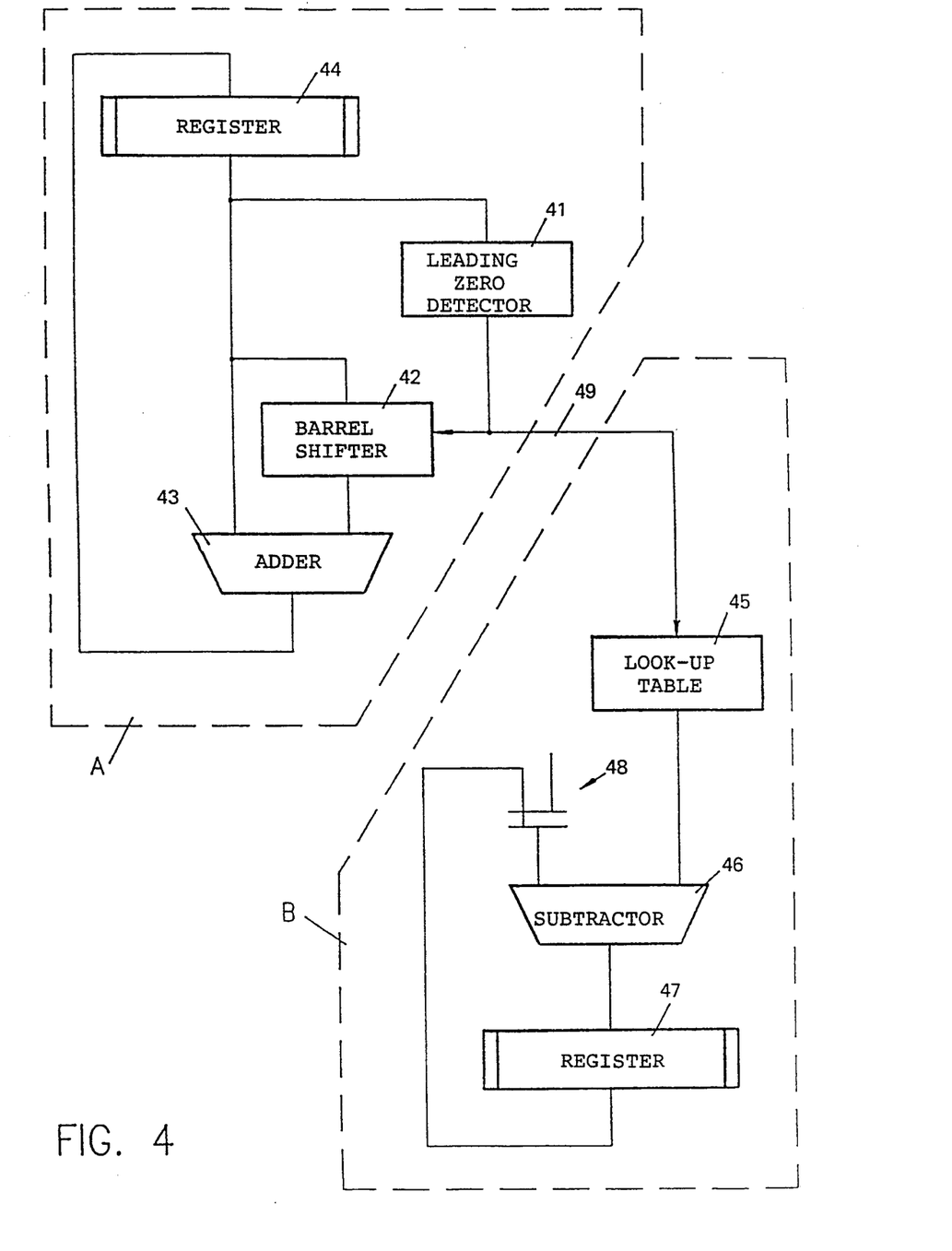
FIG. 4 is a diagram depicting the inventive digital circuit.

The inventive concept is advantageously implemented in a digital circuit. FIG. 4 shows a schematic diagram of such a digital circuit according to the invention. The digital circuit comprises two subcircuits A and B working in parallel. The first subcircuit A comprises a leading zeros detector 41, a barrel shifter 42, an adder 43 and register means 44. An input of the leading zeros detector 1 is interconnected to an output of the register means 44, whereas an output of the leading zeros detector 41 is interconnected to an input of the barrel shifter 42. Another input of the barrel shifter 42 is interconnected to the register means 44 whereas an input of the adder 43 is interconnected with an output of the register means 44 and another input of the adder 43 is interconnected with an output of the barrel shifter 42. An output of the adder 43 is interconnected with the register means 44.

The subcircuit B comprises a look-up table 45, a subtracter 46, register means 47 and storage means 48 for storage of a constant value $\log_B B$ which equals 1. The two subcircuits A and B are interconnected by interconnecting means 49.

For the calculation of a logarithm the mantissa M is stored in the register means 44. Subsequently the leading zeros detector 41 detects the digits position N of the most significant zero digit in said number M. The result of this detection is fed into the barrel shifter 42 so that the number M is correspondingly shifted to the right. Further the result of this shifting performed by barrel shifter 42 and the content of the register means 44, which is the number M are added by the adder 43. The result of this addition is stored in the register means 44, so that the above described procedure may begin again. The operation of the subcircuit A corresponds to steps 32, 32a and 32b of the flowchart shown in FIG. 3.

The look-up table 5 of the subcircuit B comprises the logarithms $\log_B f_i$ of all possible factors $f_i$, preferably in sequential order. If the leading zeros detector outputs the result of a detection to the barrel shifter 42, this result is transmitted via the interconnecting means 49 to the look-up table. Thereby the corresponding entry in the look-up table is accessed based on the result of this detection. The corresponding logarithm is output to the subtracter 46 where an approximation $S_K$ is calculated according to equation (12). In the first iteration this logarithm is subtracted from the value stored in the storage means 48 according to equation (11). The first subtotal $S_1$ is stored in the register means 47, which is interconnected to the subtracter 46. In subsequent iterations the value stored in the register means 47 is fed into the subtracter 46, so that equation (12) actually is evaluated. The operation of the subcircuit B corresponds to steps 32A and 32B shown in FIG. 3.

FIG. 5 shows the probability distribution of the number of multiplications Q necessary to obtain the logarithm of an arbitrary number m according to the teaching of the invention. The resulting probability distribution p(Q) is approximately described by a Gaussian-distribution. The constant value const. corresponds to the number of machine cycles necessary to format the number m and to add the exponents E according to steps 31 and 34 of the above described flow-chart of FIG. 3.

Based on the foregoing, apparatus and methods for determining the logarithm of a number have been disclosed. However, numerous modifications and substitutions can be made without deviating from the scope of the present invention. Therefore, the invention has been disclosed by way of illustration and not limitation, and reference should be made to the following claims to determine the scope of the present invention.

We claim:

1. A computer system for calculating a logarithm to a base B of a number M, said apparatus comprising:

first hardware means for storing approximate or exact logarithms to the base B of a predetermined set of numbers;

second hardware means for subsequently determining intermediate values I, using a shifter and adder, and detecting a position of a most significant zero digit in each of said number M and said intermediate values $I_i$ wherein $f_i = 1 + B$ to the power of $(N_i - 1)$ where N is the position of the most significant zero digit of M for i=1 and of the intermediate value $I_i$ for i greater than 1, $I_1 = M \times f_1$, $I_i = I_{i-1} \times f_i$ for i greater than 1; and third hardware means for looking up and fetching the logarithms of $f_i$ from said first hardware means and including a subtractor for subtracting from one all of said logarithms of $f_i$, said third hardware means subtracting the log of $f_i$ independently of said second hardware means adding $I_{i-1}$ with the shifted $I_{i-1}$ once the position of the respective most significant zero digit is determined.

2. A system as set forth in claim 1 wherein said base B equals two.

3. A system as set forth in claim 2 wherein said number M is normalized to a value greater than or equal to one and less than or equal to B, and further comprising means for adding an exponent E to a result of the subtracting to yield a logarithm to the base B of m, wherein $m = M \times B$ to the power of E, M is a mantissa, and E is an exponent of m.

4. A system as set forth in claim 2 wherein M is greater than or equal to one and less than or equal to two.

5. A system as set forth in claim 1 wherein $M \times f_1 \times f_2 \times \ldots f_p$ approximates or equals the base B.

6. A system as set forth in claim 1 wherein said shifter barrel shifts each of said number M and said intermediate values a number of digit positions corresponding to a position of the respective most significant zero digit.

7. A system as set forth in claim 6 wherein said second hardware means further comprises means for adding said number M with the barrel shifted number M, and adding each of said intermediate values with the respective barrel shifted intermediate value.

8. A system as set forth in claim 1 wherein said second hardware means determines said intermediate values sequentially and said third hardware means looks up and subtracts the logarithm of $f_i$ while said second hardware means determines $I_i$, for a multiplicity of different integer values of i.

9. A system as set forth in claim 1 wherein said third hardware means begins the look-up of logarithm $f_i$ at substantially the same time that said second hardware means begins shifting of $I_{i-1}$ to determine $I_i$.

10. A system as set forth in claim 1 wherein said second hardware means determines said intermediate values sequentially and said third hardware means looks up and subtracts the logarithm of $f_i$ while said second hardware means determines $I_i$ and detects the position of the most significant zero digit of $I_i$.

11. A computer system for calculating a logarithm to a base B of a number M, said apparatus comprising:

first hardware means for storing approximate or exact logarithms to the base B of a predetermined set of numbers;

second hardware means for subsequently determining intermediate values $I_i$ using a shifter and adder, and detecting a position of a leading zero digit in each of said number M and said intermediate values $I_i$ wherein $f_i = 1 + (B - Y)$ to the power of $(N_i - 1)$ where N is the position of the leading zero digit of M for i==1 and of the intermediate value $I_i$ for i greater than 1 and Y is an integer less than B, $I_1 = M \times f_1$, $I_i = I_{i-1} \times f_i$ for i greater than 1; and third hardware means for looking up and fetching the logarithms of $f_i$ from said first hardware means and including a subtractor for subtracting from one all of said logarithms of $f_i$, said third hardware means subtracting the logarithms of $f_i$ independently of said second hardware means adding $I_{i-1}$ with the shifted $I_{i-1}$ once the position of the respective leading zero digit is determined.

12. Method for calculating a logarithm to a base B of a number M, said method comprising the computer implemented steps of:

storing in a hardware memory approximate or exact logarithms to the base B of numbers in a predetermined set;

using a first hardware circuit, subsequently determining intermediate values $I_i$ and detecting a most significant zero digit in each of said number M and said intermediate values $I_i$ wherein $f_i = 1 + 2$ to the power of $(N_i - 1)$ where N is the position of the most significant zero digit of M for i=1 and of the intermediate value $I_i$ for i greater than 1, $I_1 = M \times f_1$ $I_i = I_{i-1} \times f_i$ for i greater than 1; and using a second hardware circuit, subsequently looking-up and fetching from said memory the logarithms of $f_1$ and subtracting all the fetched logarithms of $f_1$ from one to yield an approximate or exact value for the logarithm of M to the base B; and wherein the step of subtracting the logarithm of $f_1$ is performed independently of the step of determining $I_i$ once the position of the respective most significant zero digit is detected.

13. Method as set forth in claim 12 wherein said base B equals two.

14. Method as set forth in claim 13 wherein said number M is normalized to a value greater than or equal to one and less than or equal to B, and further comprising the step of adding an exponent E to said sum to yield a logarithm to the base B of m, wherein $m = M \times B$ to the power E, M is a mantissa, and E is an exponent of m.

15. Method as set forth in claim 13 wherein $M \times f_1 \times f_2 \times \ldots f_p$ approximates or equals the base B.

16. Method as set forth in claim 13 wherein M is less than or equal to two and greater than or equal to one.

17. Method as set forth in claim 12 wherein said determining step further comprises the step of barrel shifting each of said number M and said intermediate values a number of digit positions corresponding to a position of the respective most significant zero digit.

18. Method as set forth in claim 17 wherein the determining step further comprises the step of adding said number M with the barrel shifted number M, and adding each of said intermediate values with the respective barrel shifted intermediate value.

19. Method as set forth in claim 12 wherein the determining step comprises the step of determining $f_i = 1+((B-Y)$ to the power of $N-1)$ wherein N represents the position of the most significant zero digit of the respective number M or intermediate value and Y is an integer less than B.

20. A method as set forth in claim 12 wherein said look-up of logarithm $f_i$ begins at substantially the same time as shifting of $I_{i-1}$ to determine $I_i$.

21. A method as set forth in claim 12 further comprising the step of controlling a process using said logarithm of M to the base B.

22. A method as set forth in claim 12 further comprising the step of simulating an electric or magnetic field based on said logarithm of M to the base B.

23. A method as set forth in claim 12 further comprising the step of processing a radar signal based on said logarithm of M to the base B.

24. A method as set forth in claim 12 further comprising the step of controlling a chemical process in which a concentration varies according to said logarithm of M to the base B.

25. A method as set forth in claim 12 wherein the determining step determines said intermediate values sequentially and, for a multiplicity of different integer values of i, the look up and subtracting steps are performed for the logarithm of $f_i$ while the determining step determines $I_i$.

26. A method as set forth in claim 12 wherein the look-up of the logarithm of $f_i$ begins at substantially the same time as the shifting of $I_{i-1}$ to determine $I_i$.

27. A method as set forth in claim 12 wherein the determining step determines said intermediate values sequentially and the look up and subtracting steps are performed for the logarithm of $f_i$ while the determining step determines $I_i$ and the detecting step detects the position of the most significant zero digit of $I_i$.

* * * * *